United States Patent

Williams et al.

(10) Patent No.: US 6,545,283 B1
(45) Date of Patent: Apr. 8, 2003

(54) PROCESS OF IMPROVING THE WHITENING OF A POLYMERIC TAMPON APPLICATOR

(75) Inventors: Karla E Williams, Westwood, NJ (US); Suzanne E Assenheimer Downs, Ho-Ho-Kus, NJ (US)

(73) Assignee: Playtex Products, Inc., Westport, CT (US)

(*) Notice: Subject to any disclaimer, the term of this patent is extended or adjusted under 35 U.S.C. 154(b) by 0 days.

(21) Appl. No.: 09/573,103

(22) Filed: May 17, 2000

(51) Int. Cl.[7] ................................. H01J 40/00
(52) U.S. Cl. ...................... 250/492.3; 250/492.2; 250/492.1; 250/492.21; 250/492.23; 604/11; 604/13; 604/378; 604/364; 604/904
(58) Field of Search ............. 250/492.3, 492.2, 250/492.1, 492.21, 492.23; 604/11, 13–18, 364, 904; 522/162; 204/157.6, 901

(56) References Cited

U.S. PATENT DOCUMENTS

| 1,948,281 A | | 2/1934 | Smith ........................ 260/103 |
| 3,657,533 A | | 4/1972 | Spillers ............... 250/49.5 TE |
| 3,882,196 A | | 5/1975 | Hanke ....................... 260/895 |
| 3,911,917 A | | 10/1975 | Hanke ....................... 128/263 |
| 4,105,033 A | * | 8/1978 | Chatterjee et al. ........... 162/146 |
| 4,209,551 A | | 6/1980 | Masaki et al. ................ 427/68 |
| 4,254,008 A | * | 3/1981 | Krsek ......................... 523/118 |
| 4,731,285 A | | 3/1988 | Anthonsen .................. 428/323 |
| 4,846,164 A | * | 7/1989 | Martz ........................ 428/90 |
| 5,002,526 A | | 3/1991 | Herring ...................... 604/11 |
| 5,061,258 A | * | 10/1991 | Martz ........................ 128/898 |
| 5,171,762 A | | 12/1992 | Miller et al. ................ 522/162 |
| 5,346,725 A | * | 9/1994 | Targosz ................... 106/18.32 |
| 5,454,801 A | * | 10/1995 | Lauritzen ................... 604/378 |
| 5,473,165 A | | 12/1995 | Stinnett et al. ......... 250/492.21 |
| 5,532,495 A | | 7/1996 | Bloomquist et al. .... 250/492.21 |
| 5,593,395 A | * | 1/1997 | Martz ........................ 602/58 |
| 5,620,742 A | * | 4/1997 | Lauritzen ................... 427/209 |
| 5,856,675 A | * | 1/1999 | Ivanovich et al. ....... 250/492.3 |
| 5,859,076 A | * | 1/1999 | Kozma et al. ............. 264/45.2 |
| 5,916,841 A | * | 6/1999 | Amano et al. .............. 503/200 |

FOREIGN PATENT DOCUMENTS

WO    WO 01/87578 A1 * 11/2001     ........... B29C/71/04

* cited by examiner

Primary Examiner—Bruce Anderson
Assistant Examiner—Bernard Souw
(74) Attorney, Agent, or Firm—Ohlandt, Greeley, Ruggiero & Perle, LLP

(57) ABSTRACT

A process treats the surface of a polymeric tampon applicator so as to improve its whitening. The process applies electron beam energy to the applicator in sufficient magnitude and time duration to achieve the desired whitening.

20 Claims, 1 Drawing Sheet

PROCESS OF IMPROVING THE WHITENING OF A POLYMERIC TAMPON APPLICATOR

BACKGROUND OF THE INVENTION

1. Field of the Invention

The present invention relates to a process of improving the whitening, and thus color, of tampon applicators. In particular, the present invention relates to a process that whitens or maintains the whiteness (color) of polymeric tampon applicators, especially biodegradable tampon applicators.

Tampon applicators are conventionally manufactured either of a plastic, a cardboard or a paper based material. Plastic tampon applicators are typically manufactured by using an injection molding process. The injection molding process allows desirable features, such as a petal shaped expulsion end and a finger grip to be molded into any desired shape to provide a reliable and high quality product.

A disadvantage of some known plastic tampon applicators is that the plastic material is not biodegradable. While such applicators flush, they do not decompose. Therefore, such applicators may accumulate in septic tanks or on screens in wastewater treatment plants and may cause blockages. In addition, plastic tampon applicators typically neither float nor settle to the bottom of settling tanks so they are not easily removed as sludge or by skimmers.

2. Description of the Prior Art

One plastic material that is dispersible in water and that has been used for tampon applicators is polyvinyl alcohol. Polyvinyl alcohol plastic material for use in tampon applicators is described, for example, in U.S. Pat. Nos. 3,882,196, 3,911,917 and 5,002,526. However, polyvinyl alcohol suffers from discoloration, as well as a strong vinegary odor as described in U.S. Pat. No. 3,882,196 at column 1, line 25 et seq. As further described in U.S. Pat. No. 3,882,196, these problems are resolved prior to injection molding by adding to the polyvinyl alcohol a proton acceptor, such as titanium dioxide, to eliminate the odor, and a white pigment to improve the color to an off-white color. The off-white color, though an improvement, is not pleasingly aesthetic to many women.

U.S. Pat. No. 3,657,533 provides a process of preparing bilaterally oriented films of polymers of ethylene (heat shrink films). The process includes a step of irradiating plastic tubing by means of an electron beam for cross linking to provide strength uniformly in the finished heat shrink film product.

U.S. Pat. Nos. 5,473,165 and 5,532,495 provide ion beam generators that produce an ion beam characterized by pulses of ion energy for a variety of applications including the modification of the near surface microstructure of various materials including polymers.

U.S. Pat. No. 5,454,801 provides a process for forming a polymer coating for the cover of absorbent articles such as sanitary napkins, diapers and the like. The coating is formed of a polymer into a liquid phase and then foamed, either before or after coating, onto the substrate. The foam can be prepared by cross-linking polyethylene and polypropylene either chemically or by radiation provided by an electron gun and then curing the cross-linked polymer by heating. Whiteness of the coating is improved by adding white pigment prior to curing. The curing operation may be performed by means of radiant or thermal energy, for example, heat, ultraviolet light or electron beam.

U.S. Pat. No. 5,171,762 provides a process that improves the APHA color (yellowness) of a polymer, particularly polytetrahydrofuran, by subjecting the polymer to microwave energy for a sufficient time to melt the polymer.

Thus, the prior art has improved the whiteness of a polyvinyl alcohol tampon applicator by adding white pigment to the polyvinyl alcohol prior to injection molding with the result of an off-white color that is not pleasingly aesthetic to many women. Also, the prior art has irradiated the surface of polymers for the purpose of cross-linking with pulsed ion beams, has prepared foamed polymers by cross-linking with radiation provided by an electron gun, has cured foamed polymers with radiant or thermal energy, for example heat, ultraviolet light or electron beams. Such methods have affected the polymer and are also believed to be expensive. The prior art has attempted to improve the yellowness of polytetrahydrofuran by applying microwave energy for a sufficient time to melt it. Therefore, none of the prior art has improved the whiteness of plastic tampon applicators by simple surface treatment after injection molding.

SUMMARY OF INVENTION

It is an object of the present invention to provide a process that improves the whiteness or color of a polymeric tampon applicator.

It is another object of the present invention to provide such a process that provides a surface treatment to the tampon applicator after injection molding to improve its whiteness.

It is still another object of the present invention to provide such a process that subjects the surface of the tampon applicator to electron beam radiation to improve whiteness.

It is a further object of the present invention to provide such a process that i s relatively inexpensive.

These and other objects of the present invention will be accomplished by the process of the present invention that improves the whiteness of a polymeric tampon applicator by applying to its surface a beam of electrons, sufficient in energy and time duration to whiten the color of the tampon applicator. The tampon applicator is preferably a biodegradable tampon applicator. The preferred biodegradable tampon applicator is made of polyvinyl alcohol.

BRIEF DESCRIPTION OF DRAWINGS

Other and further objects, advantages and features of the present invention will be understood by reference to the following specification in conjunction with the accompanying drawings, in which like reference characters denote like elements of structure.

DESCRIPTION OF THE INVENTION

Figure 1:
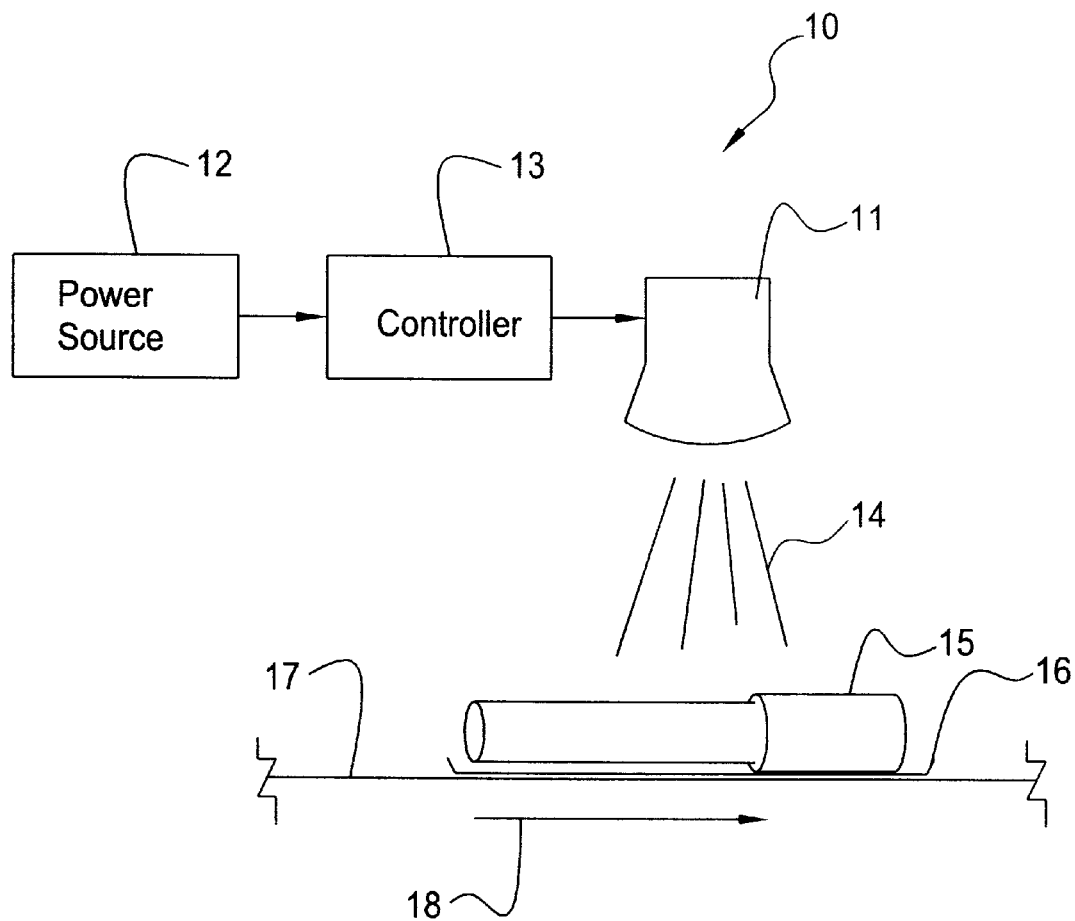
FIG. 1 is a diagram illustrating the irradiation system used by the process of the present invention.

The process of the present invention treats the surfaces, especially the outer surface, of a polymeric tampon applicator with electron beam energy to whiten discernibly the outer surface. Whiten means a whiter color of the surface than would have been absent the present process.

The process of the present invention is applied after the formation of the tampon applicator. Moreover, the process is effective to improve whiteness even though nothing needs to be added to the polymer. The process of the present invention can be applied to a polymeric tampon applicator that may or may not be biodegradable. Thus, the polymeric tampon applicator can be plastic, which may or may not be biodegradable, or biodegradable polymers. However, the present invention is particularly useful for biodegradable tampon applicators where the whiteness of the surface of the tampon applicator has been problematic.

The biodegradable polymer tampon applicator is preferably polyvinyl alcohol. However, other polymers such as starch, polyacrylic acids, polyvinylpyrrolidone or polyethylenimine can also be used. The polyvinyl alcohol contains white pigment, for example, titanium dioxide. The white pigment is mixed with the polyvinyl alcohol material prior to its formation into a tampon applicator as by extruding or injection molding. After formation, the applicator has an off white color as pointed out by the aforementioned U.S. Pat. No. 3,882,196.

Referring to the drawings and, in particular, to FIG. 1, there is provided an electron beam radiation system generally represented by numeral 10. The electron beam radiation system 10 may be employed in the process of the present invention. The electron beam radiation system 10 includes an electron gun 11 that receives operating power from a power source 12. The power source 12 is under the control of a controller 13. The electron gun 11 is arranged to emit an electron beam 14.

The electron beam 14 is positioned incident on a surface of a tampon applicator 15 that is to be treated, preferably the outer surface of the tampon applicator. The tampon applicator 15 is preferably situated in a carrier 16. The carrier 16 is moved past the electron gun 11 in the direction indicated by arrow 18. However, it should be understood that the carrier 16 can reciprocate back and forth or move in the direction opposite that shown in FIG. 1.

The electron gun 11 is positioned from the carrier 16 so that the gun does not physically contact the outer surface of the tampon applicator 15. The actual distance between the end of the electron gun 11 and the outer surface of the tampon applicator 15 is such that the gun or electron beam 14 will not melt or damage the structure of the outer surface, but preferably will otherwise optimize the desired effect of the electron beam incident on the outer surface.

The speed of travel of the tampon applicator 15, and thus outer surface, past the electron gun 11 is about 20 feet per minute. As shown in FIG. 1, the electron gun 11 applies the electron beam 14 continuously to the outer surface of the tampon applicator 15 as the tampon applicator is passed by the gun.

It is believed that the electron beam 14 irradiates the near outer surface microstructure of the tampon applicator 15 to alter the chemical characteristics of the near outer surface structure or microstructure. This results in a whitening of the tampon applicator 15.

Improved whitening can be achieved when the electron gun 11 applies an electron beam dosage of about 2 to 10 Mrad(millions of radiation absorbed doses) to the outer surface to be treated. The degree of whiteness achieved is proportional to the electron beam dosage applied, in that, a dosage of 10 Mrad produces a greater whitening effect than a dosage of 2 Mrad. However, it has been found in practice that the desired whitening effect is achieved when the electron gun 11 operates at 9.5 Mev (millions of electron volts) with a power output of 150 kilowatts for a dosage of 2 to 2.2 Mrad applied continuously to a biodegradable polyvinyl alcohol tampon applicator 15 passed by the electron beam 14 at a rate of travel of about 20 ft/min. However, the operation of the electron gun 11, and thus the electron beam 14 emitted, will vary dependent upon the material of the tampon applicator 15 and, in particular, the outer surface to be treated. Nonetheless, the present invention provides for a discernible whitening on the surface, preferably the outer surface, of all polymeric tampon applicators, especially biodegradable polymers, by the application of an electron beam. The criteria is that the electron beam is applied after the formation of the tampon applicator 15 and it provides discernible whitening, as measured by color measurement equipment and/or as discernible to the human eye.

The present invention having been thus described with particular reference to the preferred forms thereof, it will be obvious that various changes and modifications may be made therein without departing from the spirit and scope of the present invention as defined in the appended claims.

What is claimed is:

1. A process for improving the whiteness of a surface of a polymeric tampon applicator, said process comprising:

applying electron beam energy to said surface of said tampon applicator, said electron beam energy being of such magnitude and duration so as to cause a discernible whitening of said tampon applicator.

2. The process according to claim 1, wherein said electron beam energy is uniformly applied to said surface of said tampon applicator.

3. The process according to claim 2, wherein said uniform application is to virtually all of said surface of said tampon applicator.

4. The process according to claim 1, wherein the electron beam energy is insufficient to melt said surface of said tampon applicator.

5. The process according to claim 1, wherein said surface is an outer surface of said tampon applicator.

6. The process according to claim 1, wherein said electron beam energy is characterized by an electron beam dose from about 2.0 Mrad to about 10.0 Mrad.

7. The process according to claim 6, wherein said electron beam dose is from about 2 Mrad to about 2.2 Mrad.

8. The process according to claim 1, wherein said tampon applicator is made of a biodegradable material.

9. The process according to claim 8, wherein said biodegradable material is polyvinyl alcohol.

10. The process according to claim 9, wherein said surface is an outer surface of said tampon applicator.

11. The process according to claim 1, wherein said tampon applicator is made of plastic.

12. The process according to claim 11, wherein said surface is an outer surface of said tampon applicator.

13. The process according to claim 1, wherein said tampon applicator is continuously passed by said electron beam energy at a travel rate of about 15 ft/min to about 25 ft/min.

14. The process according to claim 13, wherein said travel rate is about 20 ft/min.

15. A process for improving the whitening of an outer surface of a biodegradable tampon applicator, said process comprising:

applying electron beam energy uniformly to said outer surface of said tampon applicator, said electron beam energy being of such magnitude and duration so as to cause a discernible whitening to said outer surface of said tampon applicator.

16. The process according to claim 15, wherein the electron beam energy is insufficient to melt said outer surface of said tampon applicator.

17. The process according to claim 15, wherein said electron beam energy is uniformly applied to said outer surface of said tampon applicator.

18. The process according to claim 17, wherein the electron beam energy is insufficient to melt said outer surface of said tampon applicator.

19. The process according to claim 15, wherein said biodegradable material is polyvinyl alcohol.

20. The process according to claim 19, wherein the electron beam energy is insufficient to melt said outer surface of said tampon applicator.

* * * * *